(12) United States Patent
Klint et al.

(10) Patent No.: US 8,635,394 B2
(45) Date of Patent: Jan. 21, 2014

(54) METHOD, AN INTERFACE FOR VOLATILE AND NON-VOLATILE MEMORY DEVICES AS WELL AS A RELATED COMPUTER PROGRAM PRODUCT, AND A DEVICE

(75) Inventors: Jani Klint, Tampere (FI); Sakari Sippola, Tampere (FI); Matti Floman, Kangasala (FI); Jukka-Pekka Vihmalo, Tampere (FI)

(73) Assignee: Nokia Corporation, Espoo (FI)

( * ) Notice: Subject to any disclaimer, the term of this patent is extended or adjusted under 35 U.S.C. 154(b) by 699 days.

(21) Appl. No.: 11/998,355

(22) Filed: Nov. 28, 2007

(65) Prior Publication Data

US 2008/0162768 A1 Jul. 3, 2008

Related U.S. Application Data

(62) Division of application No. 11/105,324, filed on Apr. 12, 2005, now Pat. No. 7,702,839.

(51) Int. Cl.
*G06F 12/00* (2006.01)

(52) U.S. Cl.
USPC ............... 711/5; 710/300; 710/107; 710/313; 710/314; 710/315

(58) Field of Classification Search
USPC ............... 711/5; 710/107, 300, 313, 314, 315
See application file for complete search history.

(56) References Cited

U.S. PATENT DOCUMENTS

| | | | |
|---|---|---|---|
| 5,377,264 A * | 12/1994 | Lee et al. | 713/189 |
| 5,872,940 A | 2/1999 | Circello et al. | |
| 6,085,284 A | 7/2000 | Farmwald et al. | |
| 6,154,819 A * | 11/2000 | Larsen et al. | 711/163 |
| 6,185,637 B1 * | 2/2001 | Strongin et al. | 710/35 |
| 6,650,593 B2 | 11/2003 | Takemae | |
| 7,702,839 B2 | 4/2010 | Klint et al. | 710/305 |
| 2001/0014053 A1 * | 8/2001 | Li | 365/230.05 |
| 2002/0010007 A1 * | 1/2002 | Goodings et al. | 455/566 |
| 2002/0185337 A1 * | 12/2002 | Miura et al. | 185/11 |
| 2003/0189911 A1 | 10/2003 | Saifuddin et al. | |
| 2004/0148482 A1 * | 7/2004 | Grundy et al. | 711/167 |
| 2004/0164907 A1 | 8/2004 | Killen et al. | 343/700 |
| 2005/0006727 A1 | 1/2005 | Forbes et al. | 257/622 |
| 2005/0135180 A1 * | 6/2005 | Roohparvar | 365/230.06 |

(Continued)

FOREIGN PATENT DOCUMENTS

JP 2002-107240 A 4/2002
JP 2006-058831 A 3/2006

(Continued)

OTHER PUBLICATIONS

EtronTech Technology Inc., EM639165 Data Sheet Rev 1.0, 2001.*

(Continued)

*Primary Examiner* — Reginald Bragdon
*Assistant Examiner* — Gurtej Bansal
(74) *Attorney, Agent, or Firm* — Harrington & Smith

(57) ABSTRACT

Accessing data stored in a memory device through an interface, with addressing data on the memory device through at least one address bus, controlling at least data flow to and from the memory device through at least one command bus, and transferring data to and from the memory through at least one data bus wherein commands on the command bus are adjusted depending on the type of memory connected to the interface.

27 Claims, 6 Drawing Sheets

(56) References Cited

U.S. PATENT DOCUMENTS

| | | | |
|---|---|---|---|
| 2005/0239948 A1 | 10/2005 | Haik et al. | 524/496 |
| 2006/0006601 A1 | 1/2006 | Hufnagel et al. | 277/317 |
| 2007/0030838 A1 | 2/2007 | Kaikkonen et al. | |

FOREIGN PATENT DOCUMENTS

| | | |
|---|---|---|
| WO | 01/42929 | 6/2001 |
| WO | 0175898 | 11/2001 |
| WO | 2004046940 | 6/2004 |

OTHER PUBLICATIONS

Programmable Microelectronics Corp., Pm25LV512/Pm25LV010 Data Sheet Rev. 1.0, Dec. 2003.*

Cambridge Dictionary of American English, 2010.*

"Direct Rambus RIMM Module" XP002926177, Aug. 1998, pp. 1-16.

International Application No. PCT/IB2006/050738, Form PCT/ISA/220 (2 pages) dated Oct. 30, 2006 with Form PCT/ISA/210 (3 sheets) and Form PCT/ISA/237 (4 pages) Transmitting International Search Report and Written Opinion of the International Searching Authority (EPO).

Notification of Transmittal of the International Search Report and the Written Opinion of the International Searching Authority (3 pages), International Search Report (5 pages) and Written Opinion of the International Searching Authority (7 pages), 15 pages total.

"Phase alignment and crystal orientation of $Al_3Ni$ in Al-Ni alloy by imposition of a uniform high magnetic field", Science Direct, Journal of Crystal Growth 310 (Dec. 28, 2007), C. Wang et al., pp. 1256-1263.

Communication pursuant to Article 94(3) EPC (Application No. 06 711 061.9-1229) dated May 29, 2008, Form 2001 (2 pages) and Form 2906 (2 pages).

Janpanese Office Action dated Feb. 21, 2011 in parallel Japanese Patent Application No. 2008-506001 (6 pages) plus English translation thereof (10 pages) (16 pages total).

English Abstract of Japanese Publication No. 2000-172554, published Jun. 23, 2000, Aoyama Usai (1 page).

English Abstract of Japanese Publication No. 9-062607, published Mar. 7, 1997, Arai Makoto et al. (1 page).

English Abstract of Japanese Publication No. 2000-250661, published Sep. 14, 2000, Yugawa Yosuke et al. (1 page).

* cited by examiner

| Command (for an example) | Rising edge | | Falling edge | |
|---|---|---|---|---|
| | CMD0 | CMD1 | CMD0 | CMD1 |
| Precharge power down exit & Active power down exit & Self refresh exit | 0 | 0 | 0 | 0 |
| Autorefresh | 0 | 0 | 0 | 1 |
| Self refresh entry | 0 | 0 | 1 | 0 |
| Bank active & row addr | 0 | 0 | 1 | 1 |
| Read&colum add: Auto precharge disable | 0 | 1 | 0 | 0 |
| Read&colum add: Auto precharge enable | 0 | 1 | 0 | 1 |
| Write&colum add: Auto precharge disable | 0 | 1 | 1 | 0 |
| Write&colum add: Auto precharge enable | 0 | 1 | 1 | 1 |
| Burst stop | 1 | 0 | 0 | 0 |
| Precharge (entry/exit) | 1 | 0 | 0 | 1 |
| Active power down entry | 1 | 0 | 1 | 0 |
| Precharge power down mode entry | 1 | 0 | 1 | 1 |
| Mode Register Set (MRS) | 1 | 1 | 0 | 0 |
| Non-volatile command 1 | 1 | 1 | 0 | 1 |
| Non-volatile command 2 (optional) | 1 | 1 | 1 | 0 |
| NOP | 1 | 1 | 1 | 1 |

Fig.2

METHOD, AN INTERFACE FOR VOLATILE AND NON-VOLATILE MEMORY DEVICES AS WELL AS A RELATED COMPUTER PROGRAM PRODUCT, AND A DEVICE

CROSS-REFERENCE TO RELATED APPLICATION

This application is a divisional of application Ser. No. 11/105,324 filed Apr. 12, 2005 now U.S. Pat. No. 7,702,839 from which priority is claimed under 35 U.S.C. §120.

FIELD OF THE INVENTION

The application relates in general to accessing data stored in a memory device through an interface.

BACKGROUND OF THE INVENTION

Memory technology implies the need for accessing data within memory devices, such as DRAM or other memory devices. Therefore, different addressing strategies have already been proposed.

A possible feature of DRAMs is address multiplexing. This technique enables splitting the address in half and feeding each half in turn to the chip on the address bus pins.

The chip has a large array of memory capacitors that are arranged in rows and columns. To read one location in the array, the control circuit first calculates its row number, which it places on the DRAM's address pins. It then toggles the row address select (RAS) pin, causing the DRAM to read the row address. Internally, the DRAM connects the selected row to a bank of amplifiers called sense amplifiers, which read the contents of all the capacitors in the row. The control circuit then places the column number of the desired location on the same address pins, and toggles the column address select (CAS) pin, causing the DRAM to read the column address. The DRAM uses this to select the output of the sense amplifier corresponding to the selected column. After a delay called the CAS access time, this output is presented to the outside world on the DRAM's data I/O pin.

To write data to the DRAM, the control logic uses the same two-step addressing method, but instead of reading the data from the chip at the end of the operation, it provides data to the chip at the start of the operation.

After a read or write operation, the control circuit returns the RAS and CAS pins to their original states to ready the DRAM for its next operation. The DRAM requires a certain interval called the precharge interval between operations.

Once the control circuit has selected a particular row, it can select several columns in succession by placing different column addresses on the address pins, toggling CAS each time, while the DRAM keeps the same row activated. This is quicker than accessing each location using the full row-column procedure. This method is useful for retrieving microprocessor instructions, which tend to be stored at successive addresses in memory.

In addition, the provision of commands is typically provided through command strobes on the command bus. The number of different commands depends on the number of pins on the command bus with $2^N$ commands being a possibility with N being the number of pins at the command bus. With the increasing demand for different commands, the command bus needed to be expanded. However, as die size is a crucial factor in application specific integrated circuit (ASIC) design, the number of pins on the command bus needs to be decreased.

Further, the size of the buses is also relevant for the overall size of the connection interface between the memory device and the central processing unit (CPU). The higher data rates that were required, the higher the number of connection pins on the data bus were selected. This increased the size of the interface. In addition, the number of pins on the address bus and the overall number of pins of the interface determined the type of memory to be used on the interface, besides protocol issues. However, the demand for flexibility of usage of different kinds of memory devices was not accounted for. There is a need for a flexible interface, which enables the use of different kinds of memory devices with different kinds of capabilities in terms of data throughput on the data bus.

With the rising need for flexible use of standard components, there is a need for providing a memory interface enabling to use both volatile memory and non-volatile memory on one same interface. However, as non-volatile memory and volatile memory have different prerequisites for the interfaces, there needs to be a possibility to adapt the interface for use with both types of memory.

BRIEF SUMMARY OF THE INVENTION

According to an aspect of the invention there is provided a method for accessing data stored in a memory device through an interface, with addressing data on the memory device through at least one address bus, controlling at least data flow to and from the memory device through at least one command bus, and transferring data to and from the memory through at least one data bus, wherein commands on the command bus are adjusted depending on the type of memory connected to the interface.

According to another aspect, there is provided an interface for interfacing between an integrated circuit and a memory device comprising address bus pins for addressing data, control bus pins for controlling at least data flow to and from the memory device, data bus pins for transferring data to and from the memory device, and the interface is arranged to adjust commands on the command bus depending on the type of memory device connected to the interface.

One other aspect of the invention is a computer-system comprising a central processing unit and a memory device, where the central processing unit is in connection with the memory device via such an interface.

A further aspect of the invention is a computer program product with a computer program stored thereon, the program comprising instructions operating at least one processor to transfer data between a memory device and an integrated circuit such that the commands on the command bus are adjustable depending on the type of memory device connected to the interface.

A further aspect of the invention is a mobile communication device with a central processing unit and a memory device comprising an interface for interfacing between the CPU and the memory device comprising address bus pins for addressing data on the memory device, control bus pins for controlling at least data flow to and from the memory device, data bus pins for transferring data to and from the memory device, and the interface is arranged to adjust commands on the command bus depending on the type of memory device connected to the interface.

BRIEF DESCRIPTION OF THE DRAWINGS

In the drawings show.

FIG. 2 a table with different command to be transferred on the command sub-bus, according to one embodiment;

DETAILED DESCRIPTION OF THE DRAWINGS

Figure 1:
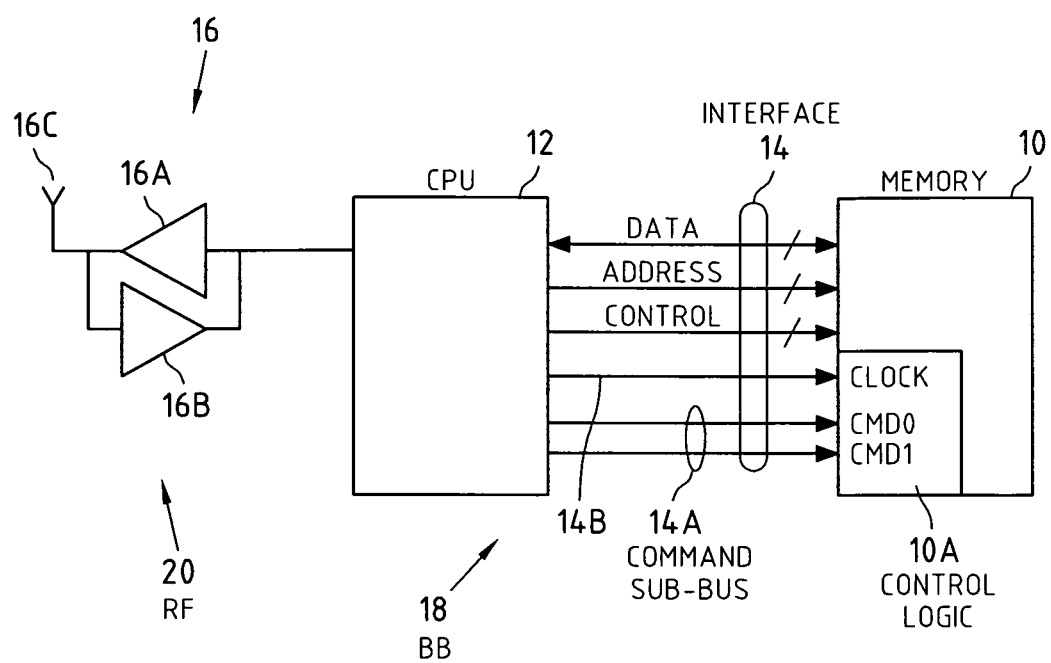
FIG. 1 a simplified block diagram of a central processing unit coupled to memory unit through a bus, where the bus includes a plurality of command signal lines, address signal lines clock signal lines and control signal lines.

By way of introduction, the embodiments of this invention reduce a number of IC pins needed for connecting an integrated circuit, such as a memory integrated circuit, such as a dynamic RAM (DRAM), to other circuitry, such as baseband circuitry in a portable wireless communications terminal. In addition, by way of the flexible provision of data flow rates on the data bus, bus width and timing, different types of memory devices can be supported by a common interface according to embodiments. For example, different volatile memory devices, such a Static Random Access Memory (SRAM) and dynamic random access memory (DRAM) can be used on a same interface as well as various non-volatile memory, for example NOR and NAND flash memory, or Non-Volatile Random Access Memory (NVRAM). Flash memory can be used as execution In Place (XIP) modules, which can also be run on the common interface.

Extending the use of current memory interfaces to Non-volatile memories may require a memory controller design which takes the varying initial access times (first latency) between different technologies into account. For example different Non-volatile memories and even different volatile memory technology may have different latency times. In addition, the burst mode latency can differ for different memory technologies, which also has to be accounted for on the common interface. Further, write protection may be necessary for some types of memory, whereas other types of memory may not require write protection.

The decision of which type of memory is used may depend on the category of the device. In the low category devices, the Non-volatile memories equipped with a flexible interface as described in this application could be used. This can be the same advanced DRAM interface as is used for DRAM memory with adequate performance, thus removing the need for one tailored interface for different types of memory entirely. In the case of a device that has no need for DRAM memory but just for non-volatile memory, the inventive interface gives a better performance for the system than any of the existing interfaces for non-volatile types of memory. The interface according to embodiments gives the possibility to append interleaving and pipelining to the system independently of the used type of memory.

If needed, in particular in high and mid-category devices, the interface could simply be multiplied to cover Static Random Access Memory (SRAM) and dynamic random access memory (DRAM), various non-volatile memory, for example NOR and NAND flash memory, or Non-Volatile Random Access Memory (NVRAM), and Mass Memory types, thus making system design easier and less expensive.

The embodiments of this invention provide a novel technique for providing control and addressing data on a common interface to the memory device by adjusting commands on the command bus depending on the type of memory connected to the interface.

Adjusting the command can comprise selecting the type of memory supported by the interface using a chip select signal.

Further, a first latency can be adjusted depending on the type of memory connected to the interface using commands on the command bus. The first latency can be set during configuration of the interface for accessing the memory.

In addition, the first latency can be adjusted by changing latency register setting within the memory.

Moreover, optionally a burst mode latency can be adjusted depending on the type of memory connected to the interface using commands on the command bus.

To enable the use of different types of memory, write protecting at least parts of the memory using write protection commands on the command bus may be supported. The write protecting can comprise using write protection commands on the address bus. Certain address areas of non-volatile memory can be protected using commands reserved for volatile memory on the command bus.

Differential clock timing, differential strobe timing, variable clock frequency, and reliability with optional DLL can be provided. In addition, the values for setting the flexible interface configuration can be, for example, stored in the memory devices by providing a special register storing differential timing data.

FIG. 1 is a simplified block diagram of a memory unit 10 coupled to a central processing unit (CPU) 12 through a interface 14. In addition to conventional bidirectional data signal lines, address signal lines, and control signal lines (such as a read/write signal line), the interface includes a command sub-bus 14A and a clock signal line 14B. For the case where the memory unit 10 is located in an IC separate from the CPU 12, each of the interface 14 signal lines needs to be connected to the memory unit 10 via an IC pin or terminal. In other embodiments, the memory unit 10 and the CPU 12 may be integrated on, or otherwise combined within, the same IC package. However, in this case the interface 14 still interfaces to the memory unit 10. Control functions for interfaced memory devices can be carried out by either the logic on the integrated circuit or an additional CPU.

Note that some signal lines could be placed in an optional control bus.

The buses can be the control, address and data (includes data strobes) buses shown in FIG. 1. Clock signal(s) are not typically referred to as a bus. In traditional memories, there is a single clock signal, but in more advanced memories, a differential clock is used, which requires two signal lines.

The interface 14 between the CPU and the memory device can be configured by the address bus for addressing data, by the control bus for controlling at least data flow to and from the dynamic random access memory, by the data bus for transferring data to and from the dynamic random access memory, and by the clock 14B for providing clocking signals to the dynamic random access memory. The control bus can be extended by command sub-bus 14A. The command sub-bus 14A can be used to adjust latency timing and/or to provide write protection modes.

The interface 14 can be arranged to vary the data flow rate on the data bus for transferring data to and from the dynamic random access memory 10. The interface can receive on the control bus instructions to vary the data flow rate such that the number of data bits transferred on the data bus within one clock cycle is adjustable through at least one command on the control bus. The data flow rate can be stored in a special register of the DRAM 10.

The data bus width on the data bus can be changed to, for example, ×2, ×4, ×8, ×16, etc. These values can be provided on the control bus. The values can be stored in a special register.

The described interface 14 allows connecting different types of memory 10 to the CPU, where the capabilities of the memory can be accounted for through setting the data flow rate, the data bus width, the latency, the burst mode, and/or write protection, accordingly. Low end systems can be operated with low pin count and low data rate, whereas high end systems can be operated with a higher data rate, which can be supported by higher quality memory 10.

The data cycles per clock and the burst length can be set through mode register set (MRS) cycles, for example. The values can be set separately. One MRS cycle can be used to configure the burst length and one MRS cycle can be used to configure the data cycles per clock.

The clock frequency on clock 14B can also vary. For example, values between 1 MHz and 266 MHz, and even higher, are possible. With a digital locked loop (dll) option in the memory 10 activated, the clock and strobes can be kept synchronized. The DLL can be stabilized with additional clocks when the clock frequency changes dynamically.

For a case where memory unit 10 and CPU 12 form a part of a communications terminal, such as a cellular telephone, there may also be a wireless section, such as a radio frequency (RF) transceiver 16 having an RF transmitter 16A and an RF receiver 16B for coupling to at least one antenna 16C. In this case, the memory 10 and the CPU 12 may be considered to form a part of a baseband (BB) section 18 of the communications terminal, as opposed to an RF section 20. Note that in this embodiment the CPU 12 may be, or may be coupled to, a digital signal processor (DSP) or equivalent high speed processing logic.

In general, the various embodiments of a device wherein the circuit constructed and operated in accordance with this invention can be included in, but are not limited to, cellular telephones, personal digital assistants (PDAs) having or not having wireless communication capabilities, portable computers having or not having wireless communication capabilities, image capture devices such as digital cameras having or not having wireless communication capabilities, gaming devices having or not having wireless communication capabilities, music storage and playback appliances having or not having wireless communication capabilities, Internet appliances permitting wireless or wired Internet access and browsing, as well as portable units, terminals and devices that incorporate combinations of such functions.

Note in the embodiment of FIG. 1 that the command sub-bus 14A includes two signal lines, labelled CMD0 and CMD1. There can also be more than two signal lines on command sub-bus 14A. The circuit can operate with n consecutive edge transitions of the clock signal on the sub-command bus, where n>=2.

The state of each command sub-bus 14B signal line can be sampled twice per clock pulse, once on the rising edge and once on the falling edge. This yields two signal line states per clock pulse, and an ability to encode up to 16 individual commands using two command signal lines in the command sub-bus 14A. Note that the clock edge sampling could be arranged so that the falling edge was used first to sample CMD0 and CMD1, followed by the next rising edge. In either case two consecutive clock edges are used to sample the state or level of at least one other signal line to determine the information that is encoded by the level(s) of the at least one other signal line.

The advanced commands can be as illustrated in FIG. 2. For example an MRS cycle can be entered with CMD0 high ("1") and CMD1 high ("1") on the rising edge of the clock signal 14B, and CMD0 low ("0") and CMD1 low ("0") on the falling edge of the clock signal 14B. This sequence of four command signal line states (1100, as in FIG. 3) is interpreted by control logic 10A in the memory unit 10 as a receipt of the Mode Register Set (MRS) command. The MRS command allows entering in a mode register set command mode, where the setting for burst length, data cycles per clock, data bus width, first latency, burst latency, write protection, etc. can be configured.

FIG. 2 illustrates an exemplary set of commands used for SRAM, DRAM, NAND and NOR flash memory, and/or NVRAM at the same time. DRAM does not require the whole set of commands. The interface 14 can utilize the commands, which are not occupied by a sole DRAM or SRAM use of the interface. The same set of commands used for DRAM or SRAM can be applied to use also Non-Volatile memories on the interface 14. For example, changing the first latency time can be done by taking into use two RFU commands defined for DRAM or SRAM use. These two commands can be the non-volatile command 1 and the non-volatile command 2.

For example non-volatile command1 can be sent from the ASIC to the memory device via interface 14 on sub-command bus 14A with CMD0 high ("1") and CMD1 high ("1") on the rising edge of the clock signal 14B, and CMD0 low ("0") and CMD1 low ("1") on the falling edge of the clock signal 14B.

The reception of this sequence of four command signal line states (1101) is interpreted by control logic 10A in the memory unit 10 as a receipt of a non-volatile command.

When command "1101" is received the memory device may enter a MRS mode. The signals on the address bus can be interpreted as commands. Specific address signals on the address bus can identify certain commands, e.g. non-volatile erase command. The address signal is used to separate different non-volatile specific commands from each other.

Some commands might also be the same as for DRAM and NVRAM e.g. read command (0100).

When using non-volatile memory devices, a command (1110) could also be used with a varying address that can separate the different commands from one another e.g. ID read, erase etc. Both commands "1110" and "1101" may be used or only one of them.

Other examples for implementation could be using commands that are not otherwise used in a non-volatile type of memory, such as autorefresh (0010) or precharge (1001).

If more commands are needed than available by using only "1110" and "1101", then these autorefresh and precharge commands could be used additionally because non-volatile memory does not need the autorefresh or precharge commands. When using autorefresh and precharge as commands for non-volatile memory devices, there is no need to define new commands. This makes it easier to implement in existing devices.

Figure 3:
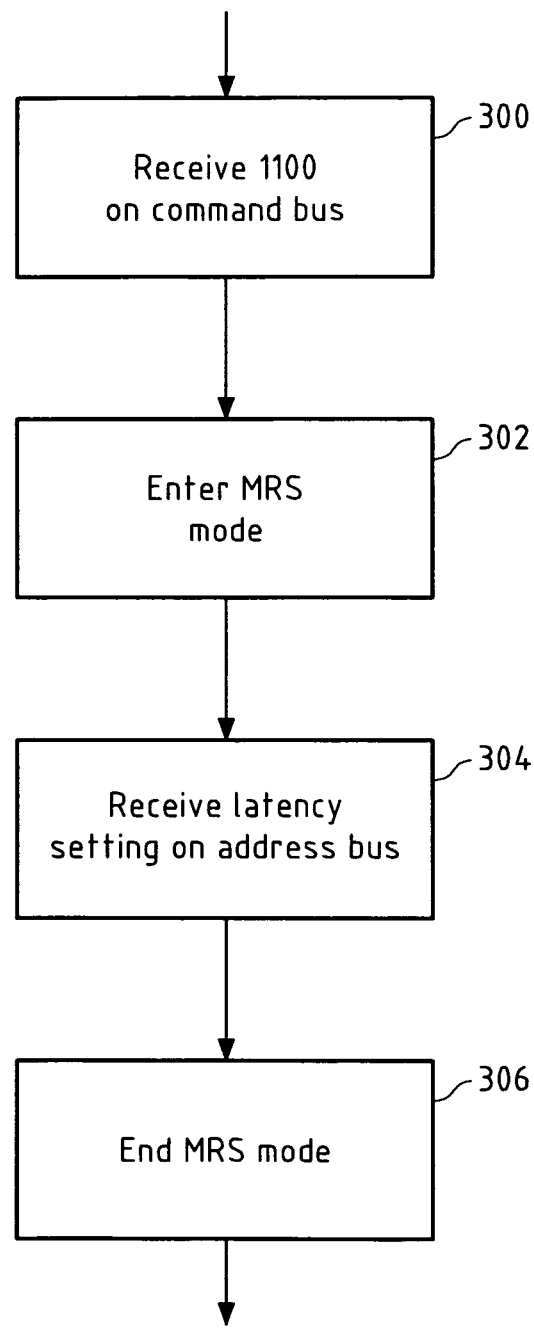
FIG. 3 a flowchart of a latency setting method according to embodiments.

Illustrated in FIG. 3 is a method for setting the latency timing.

Because the Non-volatile memory most likely has a different kind of CAS latency compared to volatile memory, a separate Non-volatile mode register set could be implemented.

For this purpose, a command (1100) could be sent from the CPU 12 to the memory device 10 via interface 14, in particular via sub-command bus 14A (300).

The reception of this command (1100) may be interpreted by the memory device to enter an MRS mode (302). In the MRS mode varying bit patterns in the address and/or data bus lines can be used to set the latency setting (304). This method would enable a significantly increased setting flexibility for the CAS latency.

Current DRAM usually has CAS latency 2 or 3 cycles, which setting is done by the mode register set command. Non-volatile memories probably need bigger values e.g. 10 cycles. Setting 10 cycles is not available in current mode register and therefore a new additional mode register set command might be needed. However DRAM may still use its normal mode register and non-volatile memory devices may have their own mode register with a bigger CAS latency setting.

This MRS mode may be ended (306) after reception of an MRS command (1100) and the latency setting on the address and/or data bus.

In order to set the latency timing, the CPU 12 may request from the memory device 10 via interface 14 its latency set range. The CPU 12 may then set itself and also the memory to a suitable value. However, this can happen also in the way that CPU 12 is already configured during the manufacturing process of the system to a proper set up for latency timing and may set the memory devices via MRS mode to the proper mode.

If non-volatile technology such as NVRAM is used on the same interface as volatile memory, some write protection is necessary. An interface providing write protection can be used with DRAM, SRAM, NVRAM, NOR Flash etc.

An interface with write protect is mainly needed in case of non-volatile memories including important data, like an operating system. However some times it is important to protect data on a volatile memory and therefore a memory interface with write protection improves the functionality of a system even in case of volatile memory access. One example of this kind of situation may be the operating system image, which may have been loaded from mass memory to the volatile memory device.

When code or data is stored in non-volatile memory there is a need to protect some areas, e.g. operating system areas. Current DRAM interfaces do not provide any method to protect non-volatile memory areas.

Having a write protection feature in a common memory interface enables both volatile and non-volatile memories usage with the same interface protocol even on one and the same interface.

Write protection can be introduced using a write protection (WP) signal on the interface 14. This write protection signal can be a signal on the address bus in combination with a special command on the command bus. It can also be introduced as an extended mode register setting or with a separate command on the command bus.

For example the auto-refresh command or the precharge command may be used together with a WP signal on the address bus. The WP signal on the address bus can tell whether the particular addressed block is to be protected or not. One (or more) address signal(s) together with the new write protect command could be used to select the type or protection. Using one particular WP address signal provides write and write&read protection features on the interface.

For example, once a WP signal is received and write protection for a certain address area is actived, no write operations are allowed anymore. The same could be applied to restricted read access. In a more advanced method, one or more address signal(s) together with a new "write protect command" on the command bus could be used to select the type or protection For example the type of protection, e.g. write/write&read protection, can be selected with a particular address signal. The rest of the address signals on the address bus may be used for selecting the address block(s) to be protected or unprotected. In case the address signals on the address bus are not enough for selecting address blocks, also data signals on the data bus could be used.

Other address signals on the address bus can be used for selecting the block(s) to be protected or unprotected.

The interface enables accessing registers for configuration with a mode register set command. The mode register set command is used to write to these registers. The actual register configuration may be done through address signals. Bank addresses BA0 and BA1 can be used to select the register to be written. BA0='0' and BA1='0' can be used with volatile memory devices to configure the CAS latency, burst type, burst length and so on.

BA0='0' and BA1='1' are used for extended mode register (driver strength, partial array refresh, temperature compensated refresh configuration) with Mobile SDRAM and Mobile DDR. PC DDRs use BA0='1' and BA1='0' for extended mode register (DLL, Drive strength)

Currently BA0='1' and BA1='1' are not used. It is proposed to use BA0='1' and BA1='1' for introducing write protection mode for the flexible interface. The blocks could be protected by issuing "write protect register set" command (mode register command with BA0='1' and BA1='1' addresses).

Figure 4:
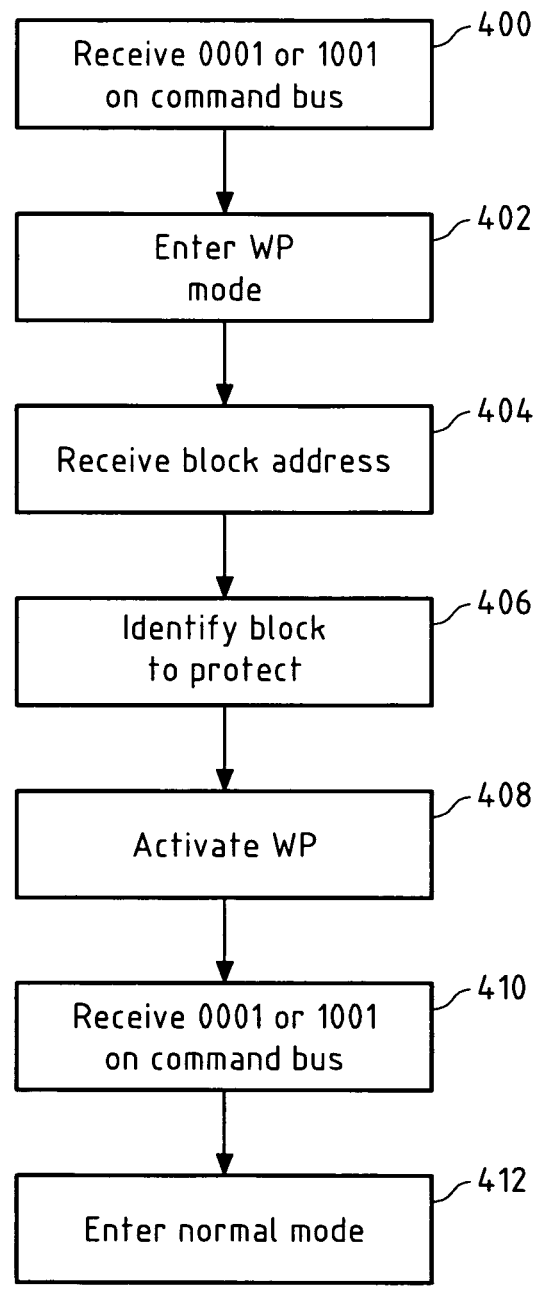
FIG. 4 a flowchart of a write protection setting method according to embodiments.

FIG. 4 illustrates a flowchart for providing write protection to a certain memory area. When using non-volatile memories on the interface, the commands auto-refresh and precharge are not used on the control bus, as indicated above. The commands self-refresh entry and exit might not necessarily be needed with volatile memory devices. Utilizing these commands in non-volatile memories could allow putting these memories into a write protection mode. In case volatile memory is used, these commands cannot be used for write protection. New commands are necessary. In this view, two implementations are possible. According to one implementation, both non-volatile memory and volatile memory use a new command. According to another implementation, non-volatile memory uses existing volatile memory commands, and volatile memory uses new commands.

For example, receiving the auto-refresh command or the self-refresh command (400) on the sub-command bus 14A, the memory device could be put into write protect mode (402).

After receiving (400) one of these commands in non-volatile memory devices, the memory devices can interpret every memory access as a write protect command. In this case, receiving on the address bus a block address (404) may be used to identify (406) which address blocks are to be write protected. However, also a bank or page or any other memory area can be protected with the described method.

For these address blocks, a write protection is activated (408). Whether write protection is activated can depend on the status of lower bits on the address bus. E.g., the lowest bit on the address bus can be used to identify activation of write protection. After the blocks are protected (408), the memory device can again be put back in to normal mode. This can happen by sending again a precharge command or a self-refresh command (410) on interface 14 and entering normal mode (412) after reception of this command.

According to another embodiment, one (or more) address signal(s) together with a write command may be used to indicate whether a password protection is used or not. If only one address signal is used to indicate the password protection, there may be only two states: password protection used and password protection not used.

With more than one address signal available on the address bus, more passwords can be introduced for protection (one user password, operating system password etc). For example, signals on the data bus could also be interpreted as passwords.

When the interface supports burst writes, the password could be delivered in sequences e.g. with 8 word (16 bits) burst, the password length could be 16 bytes. Read commands can still be interpreted on the interface as normal reads, enabling XIP usage.

Write protection according to embodiments can already be used with existing interfaces for memory devices like DDR, SDRAM, or RAMBUS.

Figure 5:
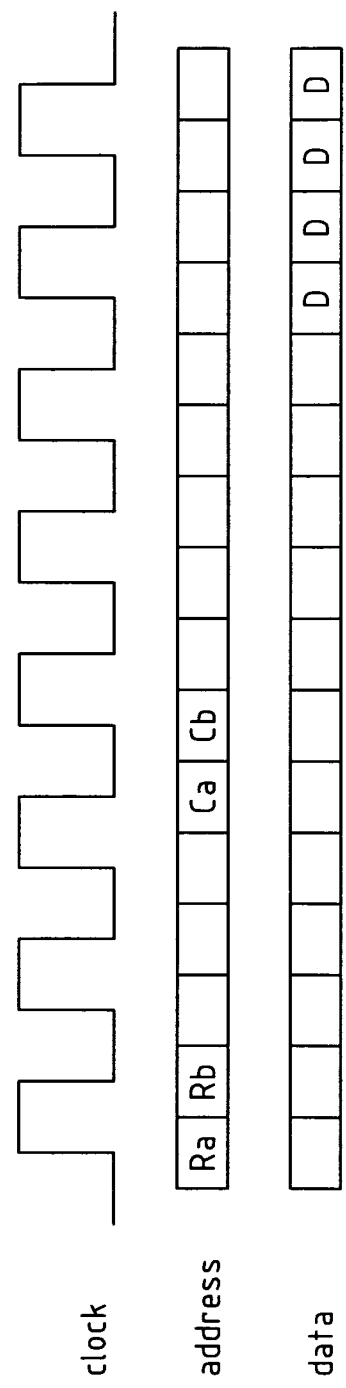
FIG. 5 a timing chart of an memory addressing.

As depicted in FIG. 5, the row address R can be divided into two parts $R_a$, $R_b$ and the column address C can also be divided into two parts $C_a$, $C_b$. By dividing row address R into the parts $R_a$, $R_b$ and column address C into the parts $C_a$, $C_b$, the number of pins at the address bus ADDRESS may be reduced by a factor of substantially two. In the depicted case, the number of parts N=2 and an exemplary address bus size ADR=13 results in the total number pins T according to an inventive embodiment as $$T = \left\lceil \frac{13}{2} \right\rceil = 7.$$

As can be seen from the timing chart at the beginning of the first rising edge the first part $R_a$ of the row address R is provided. After that, at the temporarily following falling edge of the timing clock signal CLOCK or strobe(s), the second part $R_b$ of the row address is provided. By that, with a latency of half a clock period, the complete row address R is provided. With a latency of two rising edges, the column address is provided within two parts, $C_a$, $C_b$.

As can be seen from FIG. 5, the first part $C_a$ of column address C is provided at the first falling edge after the latency of two rising edges. The column address may, however, consist of more than two parts. In such a case, it is possible, according to embodiments, that a first part may already be delivered earlier then the first falling edge, after the latency of two rising edges. The only limit for delivering the column address earlier may be that the row address needs to be fully delivered.

The second part $C_b$ of the column address C may then be provided at the temporarily consecutive rising edge. With the address information being divided into two parts, the row address R is provided with a latency of half a clock cycle and the column address C is provided at the same time as without division of the address information. The data is provided at the data bus at the same time as without division of address information. Column address C is not delayed with half a clock cycle, since the controller or the central processing unit may start sending column address C half a clock period earlier then in case of standard addressing, as addressing is already possible during a falling edge.

Figure 6:
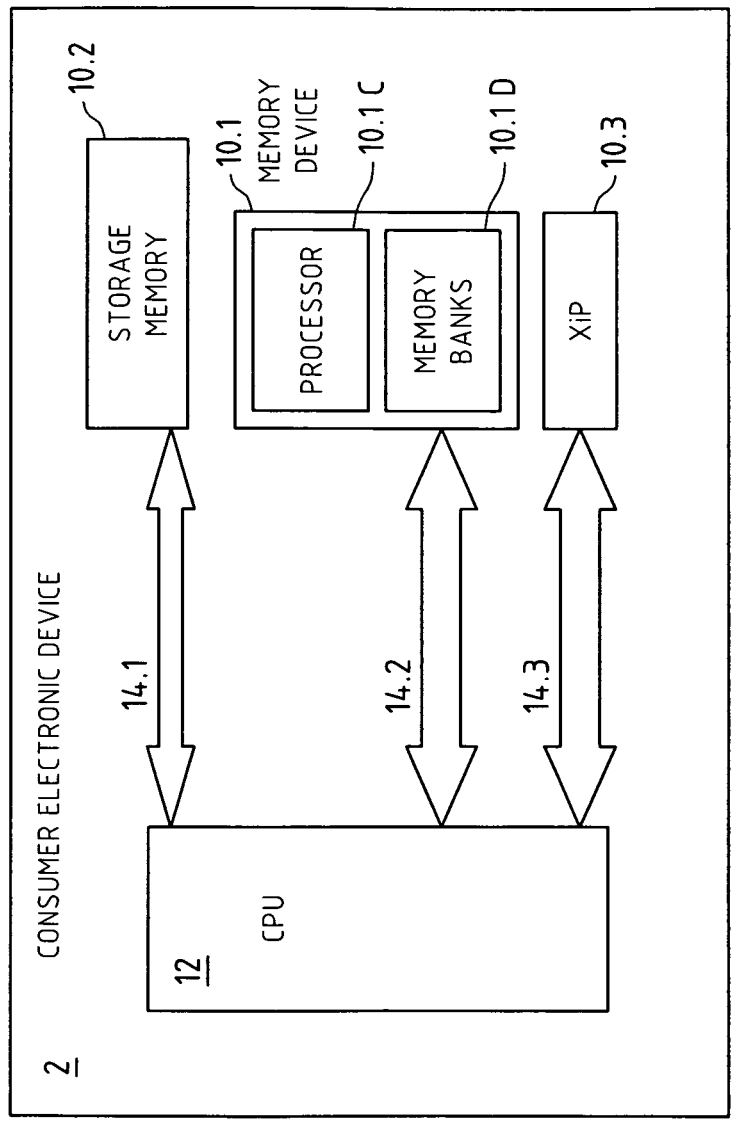
FIG. 6 a consumer electronic device using the method and memory device according to embodiments.

FIG. 6 depicts a consumer electronic device 2 comprising a central processing unit CPU 12, a first common interface 14.1 between CPU 12 and mass memory device 10.2, a second common interface 14.2 between CPU 12 and volatile memory device 10.1 and a third common interface 14.3 between CPU 12 and volatile memory device 10.3 (e.g. XiP). All interfaces 14 are of the same kind. The interface protocol supports mass memory device 10.2, volatile memory device 10.1 and non-volatile memory 10.3 by enabling flexible setting of latency, burst, write protection.

Memory device 10.1 comprises processing means 10.1C, and memory banks 10.1D, for storing the actual data.

Mass memory device 10.2, which may for example be a computer program product, such as a data carrier, may provide a computer program via interface 14.1 to CPU 12 for retrieving data from memory device 10.1 or 10.3.

The computer program comprises instructions operating at least one processor to transfer data between a Dynamic Random Access Memory and an application specific integrated circuit (ASIC) such that the data flow rate a data bus for transferring data to and from the dynamic random access memory is varied such that the number of data bits transferred on the data bus within one clock cycle is adjustable through at least one command on a control bus.

The invention claimed is:

1. A method comprising:
   addressing data on a memory device comprising a volatile memory device and a non-volatile memory device, and controlling at least a flow of the data to and from at least a selected one of the volatile memory device and the non-volatile memory device through an interface common to both the volatile memory device and the non-volatile memory of the memory device, wherein the selected one of the volatile memory device and the non-volatile memory device is selected based on at least a chip select signal provided with one or more signal lines of said common interface;
   transferring data to and from the selected memory device through a data bus of said common interface; and
   transferring via the common interface at least one command to the selected one of the volatile memory device and the non-volatile memory device of the memory device, wherein the at least one command transferred via the common interface is adjusted for a particular use dependent on whether the selected memory device is said volatile memory device or said non-volatile memory device, and wherein if said selected memory device is said volatile memory device said at least one command to said volatile memory device is adjusted for a first use to precharge an address area of said volatile memory device identified with said at least one command for implementing said at least one command, and where if said selected memory device is said non-volatile memory device said at least one command to said non-volatile memory device is adjusted for a second use different from said first use to implement said at least one command in an address area of said non-volatile memory device identified with said at least one command.

2. The method of claim 1, wherein at least a latency is adjusted depending on whether the selected memory device accessed through the common interface using commands on the common interface is said volatile memory device or is said non-volatile memory device.

3. The method of claim 1, further comprising adjusting at least a burst mode latency depending on the selected memory device using commands on the command bus.

4. The method of claim 1, wherein the selected memory device is selected by said method further comprising selecting the selected memory device supported by the common interface using a chip select signal.

5. The method of claim 1, further providing addressing data on a connected memory device and controlling at least data flow to and from the connected memory device through said common interface.

6. The method of claim 1, further providing addressing data on the selected memory device through at least one address bus, and controlling at least data flow to and from the selected memory device through said command bus.

7. The method of claim 1, wherein clock pulses are provided on one or more command signal lines of said common interface, said method further comprising sampling said commands on said common interface twice per clock pulse, once on a rising edge and once on a falling edge so as to yield two signal line states per command signal line per clock pulse.

8. The method of claim 1, wherein implementing said at least one command comprises write protecting the identified address area of the memory device using one of extended mode register settings and write protection commands on a command bus of said common interface.

9. The method of claim 8, wherein said write protecting comprises using write protection commands on a command bus of said common interface.

10. The method of claim 1, wherein a latency set range of said selected memory device is requested from said selected memory device through said interface.

11. The method of claim 10, wherein the latency is set during configuring the interface for accessing the selected memory device.

12. A consumer electronic device comprising a central processing unit having an interface connected to at least one memory device in said consumer electronic device, said interface comprising a common interface connected to said at least one memory device each comprising either a volatile memory device or a non-volatile memory device in said consumer electronic device, said common interface for addressing data, for controlling at least data flow to and from a selected memory device of the at least one connected memory device, wherein the selected one of the volatile memory device and the non-volatile memory device is selected based on at least a chip select signal provided with one or more signal lines of said common interface, and for transferring data to and from the selected memory device through at least one data bus of said interface, and the common interface is configured to
adjust commands on the interface depending on whether the selected memory device connected to the interface is said volatile memory device or said non-volatile memory device such that at least one command applicable for said volatile memory device commanded through said common interface for a first use to precharge an address area of said volatile memory device identified with said at least one command for implementing said at least one command, in case said volatile memory is said selected memory device in said consumer electronic device, is also applicable for said non-volatile memory device commanded through said common interface for a second use different from said first use to implement said at least one command in an address area of said non-volatile memory device identified with said at least one command, in case said non-volatile memory is said selected memory device in said consumer electronic device.

13. The device of claim 12, wherein said at least one command is a precharge command.

14. The device of claim 12, wherein clock pulses are provided on one or more command signal lines of said common interface, said method further comprising sampling said commands on said common interface twice per clock pulse, once on a rising edge and once on a falling edge so as to yield two signal line states per command signal line per clock pulse.

15. The consumer electronic device of claim 12, wherein said implementing comprises, write protecting the identified address area of the selected one of the volatile memory device and the non-volatile memory device using one of extended mode register settings and write protection commands on the common interface.

16. The consumer electronic device of claim 15, wherein said write protecting comprises using write protection commands on an address bus of said common interface.

17. An apparatus comprising:
at least one processor; and
at least one memory including computer program code, where the at least one memory and the computer program code are configured, with the at least one processor, to cause the apparatus to at least:
address data on a memory device comprising a volatile memory device and a non-volatile memory device, and controlling at least a flow of the data to and from at least a selected one of the volatile memory device and the non-volatile memory device through an interface common to both the volatile memory device and the non-volatile memory of the memory device, wherein the selected one of the volatile memory device and the non-volatile memory device is selected based on at least a chip select signal provided with one or more signal lines associated with said common interface;
transfer the data to and from the memory device through a data bus of said common interface; and
transfer via the common interface at least one command to the selected one of the volatile memory device and the non-volatile memory device of the memory device, wherein the at least one command transferred via the common interface is adjusted for a particular use dependent on whether the selected memory device is said volatile memory device or said non-volatile memory device, and where if said selected memory device is said volatile memory device said at least one command to said volatile memory device is adjusted for a first use to precharge an address area of said volatile memory device identified with said at least one command for implementing said at least one command, and where if said selected memory device is said non-volatile memory device said at least one command to said non-volatile memory device is adjusted for a second use different from said first use to implement said at least one command in an address area of said non-volatile memory device identified with said at least one command.

18. The apparatus of claim 17, wherein a latency set range of said selected memory device is set through said common interface, such that said volatile memory and a non-volatile memory devices are connectable to said common interface enabling use of said volatile memory and a non-volatile memory devices with said interface.

19. The apparatus of claim 17, where the at least one memory including the computer-program code is configured with the at least one processor to cause the apparatus to:
control at least data flow to and from the selected memory device, and
transfer data to and from the selected memory device.

20. The apparatus of claim 17, further providing a data bus for transferring data to and from the selected memory device.

21. The apparatus of claim 17, wherein the interface provides access to and from both volatile or non-volatile memory devices on one and the same interface.

22. The apparatus of claim 17, further providing addressing data on a connected memory device of a type selected from said different types, and controlling at least data flow to and from the connected memory device through said interface.

23. The apparatus of claim 17 comprising a mobile communication device.

24. The apparatus of claim 17, wherein the implementing comprises write protecting the identified address area using one of extended mode register settings and write protection commands on a command bus of said common interface.

25. The apparatus of claim 17, wherein clock pulses are provided on one or more command signal lines of said interface, and wherein the at least one memory including the computer program code is configured with the at least one processor to cause the apparatus to sample said commands on said interface twice per clock pulse, once on a rising edge and once on a falling edge so as to yield two signal line states per command signal line per clock pulse.

26. A non-transitory computer readable memory with a computer program stored thereon, the computer program executed by at least one processor to perform operations comprising:

addressing data on a memory device comprising a volatile memory device and a non-volatile memory device, and controlling at least a flow of the data to and from at least a selected one of the volatile memory device and the non-volatile memory device through an interface common to both the volatile memory device and the non-volatile memory of the memory device;

transferring the data to and from the memory device through a data bus of said common interface; and transferring via the common interface at least one command to the selected one of the volatile memory device and the non-volatile memory device of the memory device, wherein the at least one command transferred via the common interface is adjusted for a particular use dependent on whether the selected memory device is said volatile memory device or said non-volatile memory device, and where if said selected memory device is said volatile memory device said at least one command to said volatile memory device is adjusted for a first use to precharge an address area of said volatile memory device identified with said at least one command for implementing said at least one command, and where if said selected memory device is said non-volatile memory device said at least one command to said non-volatile memory device is adjusted for a second use different from said first use to implement said at least one command in an address area of said non-volatile memory device identified with said at least one command.

27. The non-transitory computer readable memory of claim 26, wherein clock pulses are provided on one or more command signal lines of said common interface, said method further comprising sampling said commands on said common interface twice per clock pulse, once on a rising edge and once on a falling edge so as to yield two signal line states per command signal line per clock pulse.

* * * * *